Sept. 4, 1951 T. D. THAD 2,567,158
RULING CONTROL SYSTEM FOR RECORDERS
Filed July 15, 1949
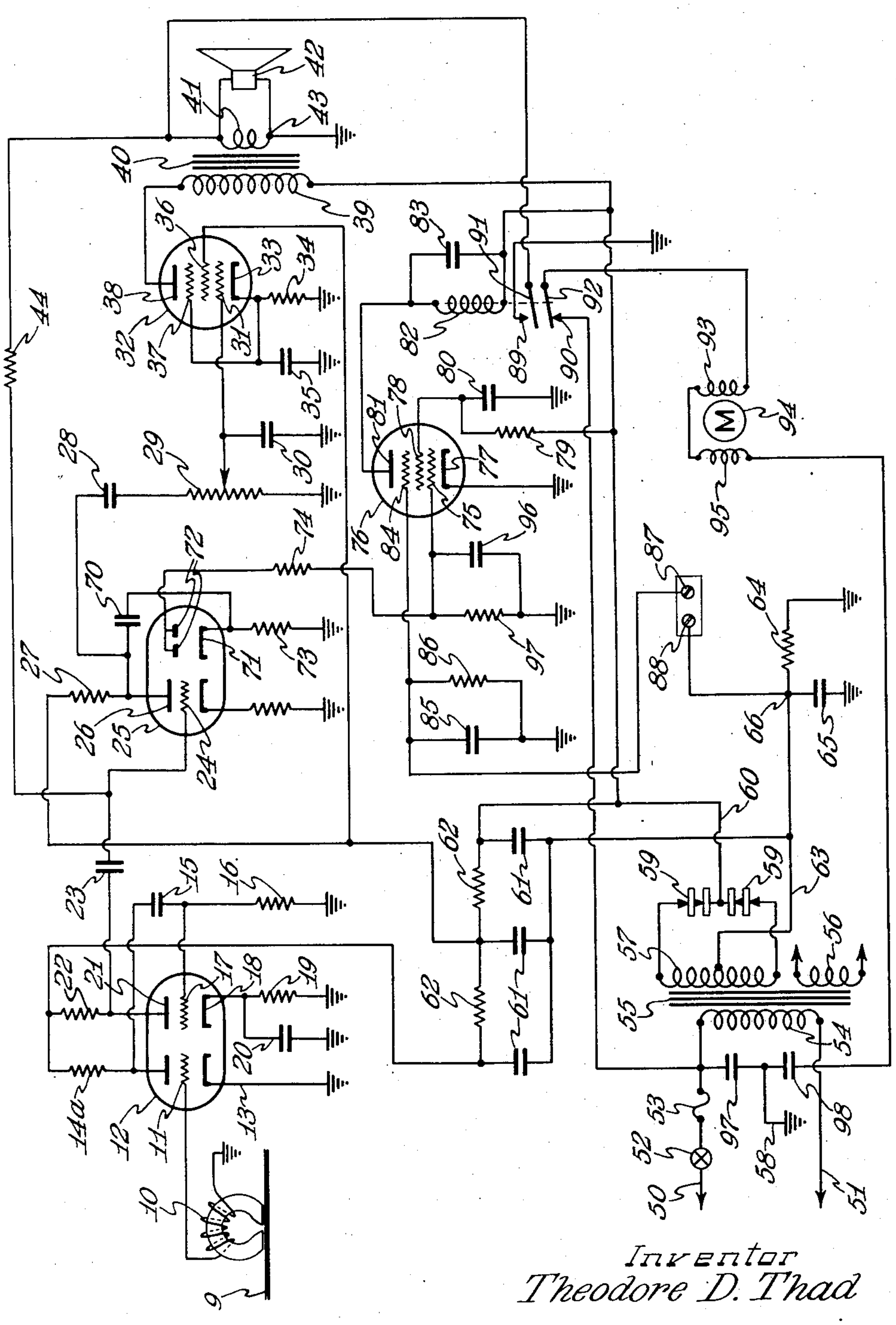
Inventor
Theodore D. Thad
by The Firm of Charles W. Hills Attys Patented Sept. 4, 1951 2,567,158

UNITED STATES PATENT OFFICE 2,567,158

RULING CONTROL SYSTEM FOR RECORDERS

Theodore D. Thad, Chicago, Ill., assignor to Morris Weintraub, Newport, Ky.

Application July 15, 1949, Serial No. 104,899

5 Claims. (Cl. 179—100.2)

The present invention relates to a magnetic recording apparatus, and more particularly, to a recording apparatus used in connection with a coin-operated vending machine.

In my previously filed copending application, Serial No. 52,569, entitled "Magnetic Recorder," I have described a particular type of vending machine using a magnetic recorder which is actuated by a coin to render short, audible messages during the time the vending machine is dispensing its contents. In the previously mentioned copending application, I have described a particular type of electronic relay circuit for use in conjunction with a dual magnetic record member, the record member containing spaced portions of audio intelligence capable of being reproduced by a magnetic pick-up head and its associated amplifier circuit, as well as a second series of control strips for energizing and deenergizing the drive motor which carries the magnetic record member past the pick-up head.

In the previously described apparatus, use was made of the endless belt type of magnetic record member so that means are provided for continuously replaying the series of audio messages carried by the magnetic record member.

In the present invention, I have now provided a magnetic recording assembly wherein the use of the control strip on the magnetic record member is eliminated, and a new type of electronic relay control circuit is used. This particular circuit provides means for energizing the driving motor to the record member upon depositing a coin in the appropriate receptacle, and also means actuated by the audio signals received from the pick-up head to keep the driving motor energized until the period of audio intelligence has been reproduced.

While the particular control circuit of the present invention will be described in connection with such a coin-operated vending machine using a magnetic recorder, it will be obvious that the circuit may also be used in other adaptations where intermittent control of the energization of a relay is to be accomplished.

An object of the present invention is to provide a novel magnetic recording apparatus for use in conjunction with vending machines.

A further object of the present invention is to provide a novel coin-operated vending machine which transmits audio messages during the period that the machine is dispensing its contents.

A further object of the present invention is to provide a novel electronic circuit for activating and deactivating a relay in the energizing circuit of a control motor.

Other and further objects of the present invention will become apparent to those skilled in the art from the following description of the attached sheet of drawing, in which the single figure thereof is a circuit diagram illustrating the amplifier circuit, the control circuit, and the power supply for the device of the present invention.

The magnetic recorder of the illustrated embodiment of my invention includes an electromagnetic transducer head 10 capable of reproducing the audio signals originally impressed upon a magnetic record member 9. While the detailed mechanical structure of the magnetic recorder is not illustrated since it forms no part of the present invention, it will be understood that the magnetic record member 9 is driven at substantially uniform speed past the electromagnetic transducer head 10. While the record member may be transferred from one stored position to another, it is preferably in the form of an endless record member having different magnetically recorded intervals of intelligence thereon. The different programs or advertising portions of recorded intelligence are separated from each other by spaces along the tape 9 equivalent in length to what would normally take two or three seconds to pass the head 10.

In my copending application, Serial No. 52,569, a separate control track was employed on the magnetic record member. As previously pointed out, the necessity for such is eliminated in the present invention, and means is provided for temporarily energizing the motor circuit of the tape driving mechanism until a recorded portion of intelligence reaches the head 10 and, thereafter, energy derived from the recorded portion is employed to keep the motor energized until such recorded portion of intelligence on the tape 9 passes beyond the head 10.

Turning first to a consideration of the amplifier circuit, it will be seen that the output of the electromagnetic transducer head is fed to the grid 11 of the first amplifying stage. The first and second amplifying stages of the network preferably are included in a dual triode 12 which should have non-microphonic characteristics. The first cathode 13 of the preliminary amplifying stage is grounded, and the plate 14 of this stage is connected by means of a plate load resistor 14*a* to a source of D. C. potential which will be subsequently described.

The output of the first amplifier stage is fed through coupling condenser 15 and grid resistor 16 to the grid 17 of the second amplifier stage of the tube 12. The cathode 18 of the second stage contains cathode-biasing resistor 19 which is grounded, and its associated by-pass condenser 20.

The plate 21 of the second amplifier stage is coupled by means of plate load resistor 22 to a source of plate potential, and the audio output of the second amplifying stage is fed by means of coupling condenser 23 to the grid 24 of the third amplifying stage.

As shown in the drawing, the third amplifying stage preferably comprises a triode-dual diode tube 25, the triode section of the tube 25 being used as an amplifier and the dual diode section being used in connection with the control circuit which will be subsequently described. The plate 26 of the triode section is coupled by means of plate load resistor 27 to a source of plate potential.

A portion of the total output of the third amplifying stage is fed by means of a coupling condenser 28 into a load potentiometer 29. The variable output from the potentiometer 29 has a grounded by-pass condenser 30 associated therewith, and the audio signal is next introduced to control grid 31 of a power amplifier pentode 32. The cathode 33 of the pentode 32 contains a cathode-biasing resistor 34 and its associated by-pass condenser 35.

The screen grid 36 is connected to a source of D. C. potential, and a suppressor grid 37 is coupled to the cathode 33. The plate 38 of the power amplifier tube 32 is supplied with a source of the high D. C. potential through the primary 39 of an output transformer 40.

The voice coil 41 of a loudspeaker 42 forms the secondary of the output circuit, with one terminal 43 of the voice coil being grounded and the other terminal supplying a source of feed-back voltage to the third amplifier tube 25 by means of a resistor 44.

The input lines 50 and 51 of the power supply are connected across a suitable source of alternating current voltage, line 60 having therein an "on-off" switch 52 and a fuse 53. The input appears across the primary 54 of an input transformer 55, and filter condensers 97 and 98, grounded at their junction by means of grounding lead 58, are provided as a shunt for high frequency variations occurring in the input.

The secondary of the power transformer 55 contains a filament winding 56 which supplies filament voltage to all the vacuum tubes of the assembly. The power output winding 57 has a pair of rectifiers 59 thereacross, with a center tap 60 providing a rectified full-wave output to a series of filter condensers 61 and the associated load-dropping resistors 62 which provide rectified D. C. potential for the various plates and screen grids of the assembly.

The output power winding 57 is also center tapped at 63 and grounded through an RC combination consisting of resistor 64 and condenser 65. It will be seen from the arrangement of the elements in the circuit that the junction 66 of the condenser 65 with the resistor 64 is maintained at a negative potential at all times.

Returning to the elements of the amplifier stage, a portion of the output of the third amplifier stage 25 is fed by means of a coupling condenser 70 to the cathode 71 of the dual diode section of tube 25. The plates 72 of this section are connected together. The impression of the audio voltage on the cathode 71, which has a cathode-biasing resistor 73 thereon, thus causes the tube to conduct only on the negative swings of the impressed audio voltage. This series of negative pulses is transmitted by the resistor 74 to the control grid 75 of the control pentode 76. The cathode 77 is grounded, and the screen grid 78 is supplied with a D. C. potential through a resistor 79 and its associated by-pass condenser 80. The plate 81 of pentode 76 is supplied with a D. C. potential through the winding of a relay coil 82 about which is connected a condenser 83.

The suppressor grid 84 of the pentode 76 has associated therewith a time-delay circuit comprising a condenser 85 having a relatively large capacitance, and a large resistor 86. The suppressor grid 84 is connected to a terminal 87, which, together with its opposed terminal 88, forms the contacting terminals of a coin-operated switch. The terminal 88 is connected to the junction 66 which, as previously mentioned, is at a negative potential with respect to ground. Thus, when a coin is inserted into the device, thereby shorting together terminals 87 and 88, a negative bias sufficient to cut off the pentode 76 is supplied to the suppressor grid 84. After the momentary shorting of the terminals 87 and 88 has been accomplished by means of the coin, the tube is maintained in its cut-off condition for a few seconds by means of the RC delay circuit comprising condenser 85 and resistor 86. The time constant of this time-delay circuit is on the order of several seconds, normally about five seconds, so that an appreciable amount of time will elapse before the condenser 85 can discharge and bring the potential on the suppressor grid 84 up to a value where the tube will again conduct.

The conductance or non-conductance of the pentode 76 activates a relay, a relay coil 82 being disposed in the plate circuit of the tube. One of the stationary relay contacts 89 is connected to ground, while the other stationary contact 90 is connected to one side of the A. C. input line.

The first of the movable contacts 91 is connected to the voice coil 41 of the loudspeaker 42, while the second of the movable contacts 92 is connected to the field winding 93 of a series motor 94. The other winding 95 of motor 94 is connected to ground potential through a condenser 98.

In the quiescent condition, the pentode 76 is normally conducting so that plate current flows through the winding 82 of the relay coil and the relay is energized. In this condition, movable contact 91 is in contact with stationary contact 89, thus grounding the input to the voice coil 41.

Upon shorting together the terminals 87 and 88, the negative bias appearing at junction 66 is transmitted to the suppressor grid 84 of the pentode 76 causing the tube to become nonconductive, thus deenergizing the relay. This condition is shown in the drawing, and it will be seen that the motor 94 is energized in this condition by virtue of the contact of the arm 92 with the stationary contact 90 thus completing the input to the driving motor 94. Also in this condition, the grounding lead from the voice coil 41 is disconnected, and the audio amplifier circuit is thus completely operative.

The suppressor grid, after its momentary drop in potential, is kept at a potential below the cut-off potential of the tube by virtue of the delay circuit comprising condenser 85 and resistor 86. While the tube is still cut off by virtue of the negative bias on the suppressor grid, the driving motor 94 acts to force the magnetic record member, preferably an endless belt type record member containing spaced magnetized recordings of audio intelligence into operative relation with the pick-up head 10 until a portion of the record member is reached which contains magnetically recorded audio intelligence thereon. As soon as an audio signal is picked up by the pick-up head 10, this signal is amplified through the various amplifying stages and a series of half-wave negative pulses appear at the control grid 75 of the pentode 76. The time elapsing between the starting of the drive motor 94 and the appearance of the first set of negative pulses upon the control grid 75 is long enough so that the motor 94 attains its operating speed, while still short enough so that the suppressor grid is maintained at a potential below cut-off by virtue of the relatively long time constant in the delay circuit associated with the suppressor grid.

Upon the reception of the first series of negative pulses from the diode section, the control grid is depressed to a value below cut-off by virtue of the delay circuit comprising condenser 96 and resistor 97. The time constant of this circuit is on the order of a fraction of a second, normally about 0.2 second. Thus, the pentode 76 will be cut off by virtue of the recurring series of pulses from the audio signal as long as the audio signal is being amplified in the amplifier circuit even though the condenser 85 eventually charges to a value sufficient to raise the potential on the suppressor grid 84 to a value which would permit conductance through the tube.

When the period of the audio signal has been completed, and the negative pulses are terminated, the condenser 96 is then able to discharge to a value sufficient to permit conductance through the tube 76. Consequently, the plate current will commence flowing through the tube, and relay coil 82 will be energized. In this condition, the line voltage is removed from the input to the motor, and the voice coil input is grounded to complete the cycle of operation.

It will be evident that various modifications may be made without departing from the principles of this invention, and it is, therefore, not the purpose to limit the patent granted hereon otherwise than necessitated by the scope of the appended claims.

I claim as my invention:

1. In a magnetic reproducing device including a magnetic reproducing head, a magnetic impulse record member, and a motor for driving said record member into operative relation with said head, a control tube having a plate circuit and a plurality of grid circuits, a relay in series with the plate circuit of said control tube, a switch controlled by said relay in series with the energizing circuit of said motor, a second switch in one of the grid circuits of said control tube, time delay means in said one grid circuit operable upon closing of said second switch to bring said relay into motor-energizing condition to thereby energize said motor and drive said record member past said head, and means in the second of said grid circuits responsive to the signals from said head to keep said relay in motor-energizing condition during the time the signals are received from said head.

2. In a magnetic reproducing device including a magnetic reproducing head, a magnetic impulse record member, and a motor for driving said record member into operative relation with said head, a control tube having a plate circuit and a plurality of grid circuits, a relay in series with the plate circuit of said control tube, a switch controlled by said relay in series with the energizing circuit of said motor, said switch being open during flow of plate current through said relay, a second switch in one of the grid circuits of said tube, a time delay circuit electrically connected in said one grid circuit and operable upon closing of said second switch to cut off plate current in said plate circuit for a relatively short period of time, thereby closing said first switch and energizing said motor, and means in the second of said grid circuits responsive to the signals received from said head to keep plate current cut off in said plate circuit during the time that signals are received from said head.

3. In a magnetic recording device, including a magnetic reproducing head, a magnetic impulse record member, and a motor for driving said record member into operative relation with said head, a control tube having a plate circuit and a plurality of grid circuits, a relay electrically connected in series with said plate circuit and energizable by plate current flow through said tube, a switch operated by said relay in series with the energizing circuit of said motor and arranged to complete the energizing circuit to said motor when said relay is deenergized, a second switch in series with one of said grid circuits, a source of negative potential of sufficient magnitude to cut off said tube in series with said second switch, a time delay circuit in said one grid circuit arranged to maintain said tube cut off for a relatively short period of time after closing of said second switch, and circuit means in another of said grid circuits responsive to signals picked up by said head for maintaining said control tube cut off during the time that signals are received from said head.

4. In a magnetic recording device, including a magnetic reproducing head, a magnetic impulse record member, and a motor for driving said record member into operative relation with said head, a control tube having a plate circuit and a plurality of grid circuits, a relay electrically connected in series with said plate circuit energizable by plate current flow through said tube, a switch operated by said relay in series with the energizing circuit of said motor and arranged to complete the energizing circuit to said motor when said relay is deenergized, a second switch in series with one of said grid circuits, a source of negative potential of sufficient magnitude to cut off said tube in series with said second switch, a time delay circuit in said one grid circuit arranged to maintain said tube cut off for a relatively short period of time after closing of said second switch, rectifying means for generating negative impulses from the electrical signals generated by said head, and a second time delay circuit connected to said rectifying means and to the second of said grid circuits for maintaining said control tube cut off during the time that signals are received from said head.

5. In a magnetic recording device, including a magnetic reproducing head, a magnetic impulse record member, and a motor for driving said record member into operative relation with the head, a pentode tube having a plate circuit, a control grid circuit, and a suppressor grid circuit, a relay electrically connected in series with said plate circuit and energizable by plate current flow through said pentode tube, a switch operated by said relay in series with the energizing circuit of said motor and arranged to close the energizing circuit to said motor when said relay is deenergized, a second switch in series with said suppressor grid, a source of negative potential of sufficient magnitude to cut off said tube in series with said second switch, a time delay circuit in said suppressor grid circuit arranged to maintain said tube cut off for a relatively short period of time after closing of said second switch, and circuit means in said control grid circuit responsive to signals picked up by said head for maintaining said pentode tube cut off during the time that signals are received from said head.

THEODORE D. THAD.

REFERENCES CITED

The following references are of record in the file of this patent:

UNITED STATES PATENTS

| Number | Name | Date |
|---|---|---|
| 1,552,321 | Lea | Sept. 1, 1925 |
| 1,634,979 | Carter | July 5, 1927 |
| 1,819,868 | Carter | Aug. 18, 1931 |
| 2,252,327 | Lovett | Aug. 12, 1941 |